Patented July 24, 1934

1,967,872

UNITED STATES PATENT OFFICE 1,967,872

WELDING ELECTRODE

Gilbert E. Doan, Bethlehem, Pa.

No Drawing. Application July 14, 1930,
Serial No. 467,977.

3 Claims. (Cl. 219—8)

This invention relates to a method and means for controlling the flow of liquid metals, and more particularly to a method for increasing the rate of detachment of liquid globules or extent of flow of metals. The invention is applicable in arts where it is desired to increase either the extent of flow of the metal or the extent of dispersion over the surface.

In the art of metal casting, the invention provides for increasing the action of the metal in penetrating narrow or restricted cavities and angles and causing the molten metal to fill the same sharply and completely. This is accomplished by so reducing the surface tension that the tendency of the molten metal to retain a spherical contour is reduced to a minimum.

The invention also increases the extent of dispersion of the metal over a surface or the wetting effect or spreading, in brazing, welding or soldering. In welding with an acetylene flame, for example, the molten metal is caused to spread out widely in a thin layer whereby the surface is more readily covered or a bond is extended even to the capillary cracks between the parts to be joined.

The invention may also be applied to arc welding and provides for increasing the extent of flow of the metal in the weld and the rate of melting of the welding rod or electrode. The invention will be particularly described as applied to a welding rod by way of illustration.

In arc welding with a metallic electrode or welding rod, the speed with which a weld is formed has been found to depend upon the rate of detachment of globules from the metal of the rod to the weld as the metal becomes molten due to the heat of the arc. The liquid globules constitute the chief form of metal transfer. These globules form on the end of the rod and increase in size until they drop from the rod into the arc. The molten metal itself is a poor conductor of heat as compared to the solid metal of the rod and accordingly interferes with the free transfer of heat to the end of the rod and the rate of melting thereof. Hence it is desirable to cause the individual globules to become detached from the rod at a rapid rate rather than to allow them to continue their growth. The present invention, therefore, provides for increasing the speed of detachment of the globules and the rate of metal transfer from the rod to the weld whereby the speed of formation of the weld may be increased.

Furthermore, the early detachment of each globule and resultant rapid melting of the electrode limits the degree of contamination of the metal by the gases surrounding it and thus improves the character of the weld.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood, however, that the processes and the steps thereof may be modified in various respects without departing from the broad spirit and scope of the invention.

In the following description and in the claims the various steps in the process and the details comprising the invention will be identified by specific names for convenience but they are intended to be as generic in their application as the art will permit.

In carrying out the present invention the speed of metal transfer is increased by causing the molten metal on the end of the welding rod to form globules and drop from the rod at a rapid rate. This is accomplished by adding an element to the metal of the rod which lowers the surface tension of the molten metal and causes the globules to drop from the end of the rod while they are of smaller size.

If each drop remains on the rod a long time before dropping into the weld two disadvantages arise: First, the formation of each succeeding globule is obstructed by the low heat conductivity of the preceding globule. Since the heat conductivity of liquid steel is only a fraction as great as that of solid steel, the globule effectually blocks the flowing process and retards the welding. Second, the adhering globule of steel becomes contaminated at the high temperature of the arc before it falls in the weld.

In ferrous welding rods it has been found that a small quantity of antimony reduces the surface tension and permits the drops to fall from the rod when they are of smaller size, thereby minimizing the interference of the molten metal with the heat transfer to the end of the rod itself. A comparatively small quantity of antimony may be used for this purpose, for example, less than 1%. This may be in the elemental form or in the form of an antimony compound such as the oxide and may be dispersed throughout the entire rod or it may be applied as a thin coating to the surface thereof or it may be placed in grooves or in a core. It has been found that less than 1% of antimony will produce a 50% increase in the rate of melting of a steel rod.

Various other elements or compounds may also be employed for this purpose, although antimony has been found to be particularly satisfactory. For example, bismuth, gallium, lead, zinc, tellurium, tin, mercury as HgO and various other substances having surface tensions substantially less than the surface tension of the metal itelf are useful to a certain extent. Tellurium and bismuth in percentages less than 10% produce a substantial increase in rate of melting.

If a coating is used it may be applied to the rod in various ways. For example, the rod may be coated with water-glass containing a predetermined portion of the material. It is obvious also that the coating may be sprayed upon the rod or may be applied electrically in which case a thin continuous film is obtained over the entire surface of the rod. In some instances it may be desirable to introduce the reagent into the arc independently of the rod to affect the globule as above described.

The above process has been described as applied to welding rods, inasmuch as it is particularly applicable thereto. It is obvious, however, that the same principles may be applied to other arts, as for example, in metal casting. If the surface tension of the molten metal is reduced, the extent of flow of the metal is increased whereby it will more completely fill the mould, including the various corners and crevices therein. For this purpose a suitable proportion of antimony may be applied to the iron or steel, or other metal which is being cast, the proportion being so small as not to interfere with the physical properties thereof, but being sufficient to reduce the surface tension and cause the mould to become completely filled. The invention is particularly applicable to iron and steel with which antimony has been found to produce the desired effect. It is obvious, however, that it may be applied to other metals, in which case a substance capable of lowering the surface tension of the particular metal involved may be incorporated therein.

The term metal flow is used herein to include the rate of flow as in welding rods and extent of flow as in casting, brazing, soldering, etc.

The term antimony as used in the claims is understood to refer to the atom whether in the form of elemental antimony or in an antimony compound.

Although certain novel features of the invention have been described and are pointed out in the annexed claims, it will be understood that various omissions, substitutions and changes in the several steps of the process and in its operation may be made by those skilled in the art without departing from the spirit of the invention.

What is claimed is:

1. A welding rod comprising iron as the principal constituent thereof, and having incorporated therewith a surface tension reducing agent in such small quantities as to substantially reduce the surface tension of the material of the rod when molten, without materially affecting the other physical properties of the iron in the rod, whereby, when the rod is subjected to a welding temperature, the drops of molten metal will more readily detach themselves from the rod onto the work, said surface tension reducing agent being selected from the group comprising tellurium, antimony, bismuth, gallium, mercury, lead, tin or zinc.

2. A welding rod comprising iron as the principal constituent thereof, and having incorporated therewith a surface tension reducing agent in such quantities as to substantially reduce the surface tension of the material of the rod when molten, without materially affecting the other physical properties of the iron in the rod, whereby, when the rod is subjected to a welding temperature, the drops of molten metal will more readily detach themselves from the rod onto the work, said surface tension reducing agent comprising antimony in substantial amounts up to 1% of the weight of the rod.

3. The method of ferrous welding which comprises raising the work to a welding temperature, adding ferrous welding material to the weld, adding also a surface tension reducing material in such small quantities as to reduce substantially the surface tension of the molten iron in the weld, without materially affecting the other physical properties of the completed weld, whereby the molten iron of the weld will spread more extensively over the work, said surface tension reducing agent being selected from the group comprising tellurium, antimony, bismuth, gallium, mercury, lead, tin or zinc.

GILBERT E. DOAN.